United States Patent

Asano

[11] 4,205,369
[45] May 27, 1980

[54] VOLTAGE DROPPING CIRCUIT

[75] Inventor: Kazuhiro Asano, Tokyo, Japan

[73] Assignee: Kabushiki Kaisha Daini Seikosha, Japan

[21] Appl. No.: 876,369

[22] Filed: Feb. 9, 1978

[30] Foreign Application Priority Data

Mar. 28, 1977 [JP] Japan .................................. 52-34186
Feb. 16, 1977 [JP] Japan .................................. 52-15916

[51] Int. Cl.² .......................................... H02M 7/00
[52] U.S. Cl. .................................................. 363/62
[58] Field of Search .......................... 307/110; 363/62

[56] References Cited

U.S. PATENT DOCUMENTS

| 3,478,258 | 11/1969 | Nagai | 363/62 |
| 3,505,586 | 4/1970 | Dulin | 307/110 X |
| 3,708,742 | 1/1973 | Gunn | 363/62 |
| 4,061,929 | 12/1977 | Asano | 363/60 X |

FOREIGN PATENT DOCUMENTS 2558656  7/1977  Fed. Rep. of Germany ............. 363/62

Primary Examiner—William M. Shoop
Attorney, Agent, or Firm—Robert E. Burns; Emmanuel J. Lobato; Bruce L. Adams

[57] ABSTRACT

This invention provides a voltage dropping circuit which is composed of capacitors and MOS field effect electronic switching elements whereby a voltage equal to M/N of the voltage of a power source is obtained.

3 Claims, 9 Drawing Figures

VOLTAGE DROPPING CIRCUIT

BACKGROUND OF THE INVENTION

In the prior art to drop the voltage of a power source, various circuit are used, such as a resistor dividing circuit, a circuit utilizing the voltage drop between the collector and the emitter of a transistor, and a DC-DC converter circuit. These circuits have large size and a power loss, and therefore, these conventional circuits are not suitable for incorporation in small equipment.

OBJECT OF THE INVENTION

The present invention aims to eliminate the above noted difficulty and insufficiency, and the object of the present invention is to provide a lower power consumption voltage dropping circuit which can be incorporated in very small size equipment such as an electronic watch.

BRIEF DESCRIPTION OF THE DRAWINGS

The above mentioned and further objects, features and advantages of the present invention will become more apparent from the following description when taken in connection with the accompanying drawings, which show preferred embodiments of the present invention and wherein.

DETAILED EXPLANATION OF THE INVENTION

The present invention relates to a voltage dropping circuit which drops the voltage of a power source without power loss.

Figure 1:
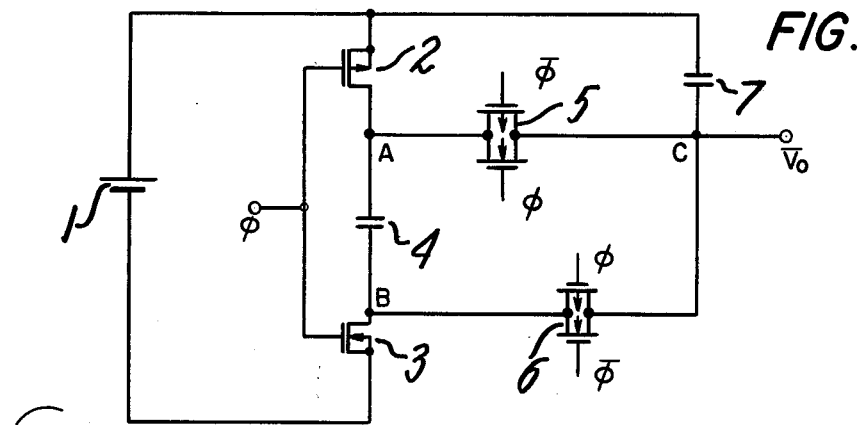
FIG. 1 illustrates a ½ voltage dropping circuit of the present invention.

FIG. 1 shows a preferable embodiment of the present invention. The reference number 1 shows a battery, and the higher voltage terminal of the battery is connected to the source of a P-type MOS-FET 2 and to one side of electrodes of a capacitor 7, respectively. While, the lower voltage terminal of the battery 1 is connected to the source electrode of a N-type MOS-FET 3.

The drain electrode of the P-type MOS-FET 2 is connected to one side of electrodes of a capacitor 4 and to one of the drain electrodes of a transmission gate (which will be refered to as T.G hereinafter) 5. The drain electrode of the N-type MOS-FET 3 is connected to the other side of the electrodes of the capacitor 4 and to one of the drain electrodes of a T.G 6. Furthermore, each gate electrode of the P-type MOS-FET 2 and the N-type MOS-FET 3 is connected to the other, and a clock signal $\phi$ is applied to both of the gate electrodes. The other drain electrode of the T.G 5 is connected to the other drain electrode of the T.G 5 and T.G 6 are connected to the other side of the electrode of the capacitor 7 and also to an output terminal $V_o$.

The T.G 5 is composed of a P-type MOS-FET and N-type MOS-FET, and clock signals $\phi$ and $\bar{\phi}$ are applied to each gate electrode of these MOS-FETs, respectively. The T.G 6 is also composed of a P-type MOS-FET and a N-type MOS-FET, and clock signals $\phi$ and $\bar{\phi}$ are applied to each gate electrode of these MOS-FETs. When the clock signal $\phi$ is at an "H" or "High" level, the T.G 5 is on, and when the clock signal $\phi$ is at an "L" or "Low" level, the T.G 6 is off.

Next, the operation of the circuit having the structure described above will be explained hereinafter. When the clock signal $\phi$ is at the "H" level, the N-type MOS-FET 3 and the T.G 5 are on, respectively, and the P-type MOS-FET 2 and the T.G 6 are off, respectively. As a result, it follows that the capacitors 7 and 4 have been connected to the battery E in series.

If the value of the capacitor 7 is equal to that of the capacitor 4, the voltage of the battery is divided into a half by these two capacitors, and the potential $V_o$ will be about a half of E.

Next, when the clock signal $\phi$ becomes the "L" level condition, the P-type MOS-FET 2 and T.G 6 will be turned on, and the N-type MOS-FET 3 and T.G 5 will be turned off.

Therefore, the capacitors 4 and 7 are to be connected in parallel between the higher potential point of the battery and the terminal $V_o$. As the result, the potential at the terminal $V_o$ will become the value of a half of E.

Again, when the clock signal $\phi$ becomes the "H" level condition, the above-mentioned operation is carried out respeatedly. As a result, approximately ½ voltage of that of the battery can always be obtained from the terminal $V_o$.

Figure 2:
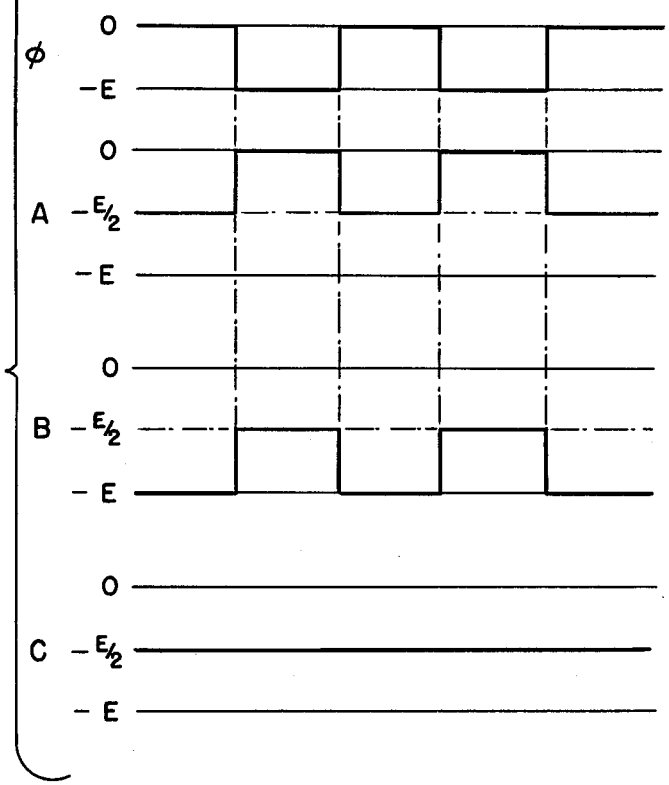
FIG. 2 illustrates a wave form chart.

The state of the operation is shown in FIG. 2 by wave forms.

As mentioned above, according to the present invention, since it is possible to drop the circuit output voltage to approximately one half the voltage of the battery without any power loss as well as to easily apply the circuit to an integrated circuit, the circuit can be incorporated in a small size apparatus, such as watch.

The circuit according to the present invention is effective for use as the power source of a logic element which operates with the voltage value of approximately 0.6 V, such as a multiplex driver of a liquid crystal device, a reference power source for color display, IIL, B-MOS and like, and the circuit of the invention is very effective.

Figure 3:
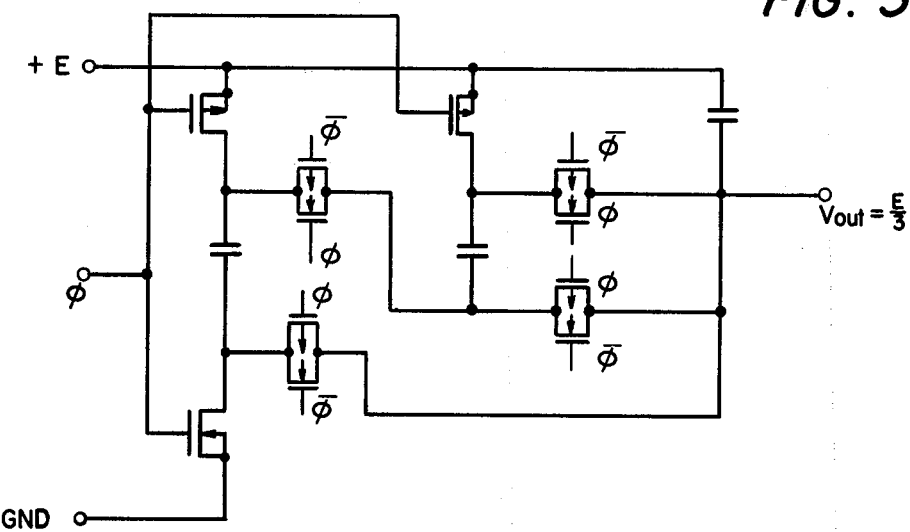
FIG. 3 illustrates a ⅓ voltage dropping circuit of the present invention.
Figure 4:
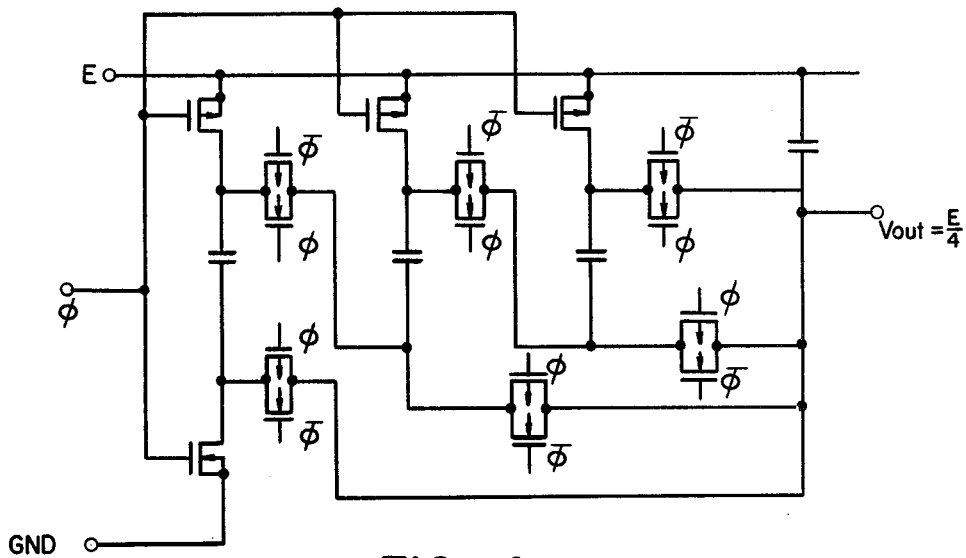
FIG. 4 illustrates a ¼ voltage dropping circuit of the present invention.

An output voltage reduced to 1/N of the power source voltage can also be obtained in using N capacitors by the circuit according to the present invention. The switching elements are not limitted to the MOS-FETs. Moreover, the present invention is also applicable to a ⅓ voltage dropping circuit shown in FIG. 3, and/or a ¼ voltage dropping circuit shown in FIG. 4 in addition to the ½ voltage dropping circuit.

Figure 5:
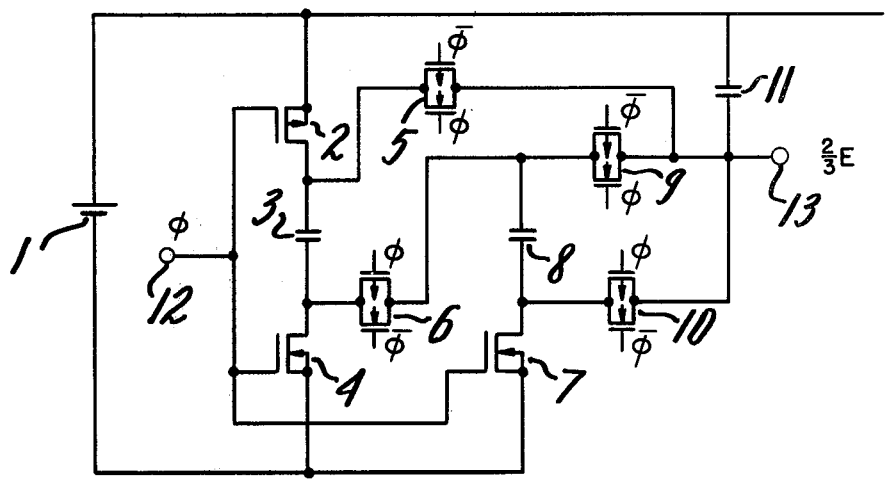
FIG. 5 illustrates a ⅔ voltage dropping circuit according to the present invention.

FIG. 5 shows a preferable embodiment of a circuit for dropping the voltage to two-third of the source voltage, according to the present invention. The reference numeral 1 shows a power source, wherein the higher potential point of power source is connected to the source of a P-type MOS-FET 2 and to one side of the electrodes of a capacitor 11, and the lower potential point of the power source is connected to the source electrodes on N-type MOS-FET 4 and 7, respectively.

The gate electrode of the P-type MOS-FET 2 is connected to an input terminal 12 to which a clock signal is applied, and the drain electrode of the MOS-FET 2 is connected to one side of the terminals of a capacitor 3 and to one of the input terminals of a transmission gate 5. The gate electrode of the N-type MOS-FET 4 is connected to the input terminal 12, and the drain electrode of the MOS-FET 4 is connected to the other side of the terminals of the capacitor 3 and to one of the input terminals of a transmission gate 6, respectively.

The gate of the N-type MOS-FET 7 is connected to the input terminal 12, the drain of the MOS-FET 7 is connected to one side of terminals of a capacitor 8 and to one of the input terminals of a transmission gate 10. The other side of the terminals of the capacitor 8 is connected to the other input of the transmission gate 6 and one of the inputs of a transmission gate 9, respectively. The other inputs of the transmission gate 5, 9 and 10 are connected to one side of the terminals of a capacitor 11 and 2/3E output terminal 13, respectively.

Next, the operation of the circuit which is constructed as described above will be explained hereinafter. When a clock $\phi$ is at an "H" level, the N-type MOS-FET 4, the N-type MOS-FET 7, the transmission gate 5 and the transmission gate 9 are on, respectively, and the transmission gate 6 and 10 are off.

Figure 6A:
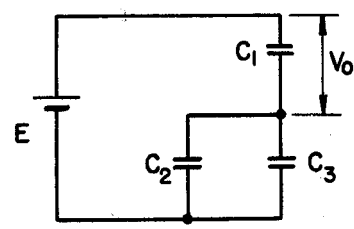
FIGS. 6a and 6b are schematic diagrams for explaining the operation of the circuit shown in FIG. 1.

In FIG. 6(a), the equivalent circuit in above mentioned status is shown. From this figure, it will be understood that when each value of three capacitors is equal to one another, $V_o$ is equal to two-third of E, the voltage of two-third of E is produced across a capacitor $C_1$, and the voltage of two-third of E is produced across each of capacitors $C_2$ and $C_3$, respectively.

Next, when clock $\phi$ becomes an "L" level, the P-type MOS-FET 2, the transmission gate 6 and the transmission gate 10 will be turned on while the N-type MOS-FET 4, the N-type MOS-FET 7, the transmission gate 5 and the transmission gate 9 will be turned off.

Figure 6B:
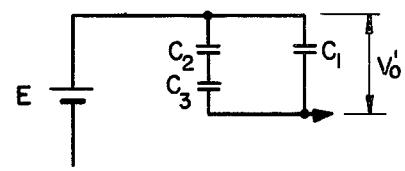

The equivalent circuit in the above mentioned case is shown in FIG. 6(b). Since the capacitors $C_2$ and $C_3$ each of which has the charge corresponding to the voltage of one-third of E is connected to each other in series, the output $V_o'$ will also become two-third of E.

The charge which is supplied to the load from the capacitor $C_1$ in the status shown in FIG. 2(a) is replenished from capacitors $C_2$ and $C_3$ in the status shown in FIG. 2(b).

Figure 7:
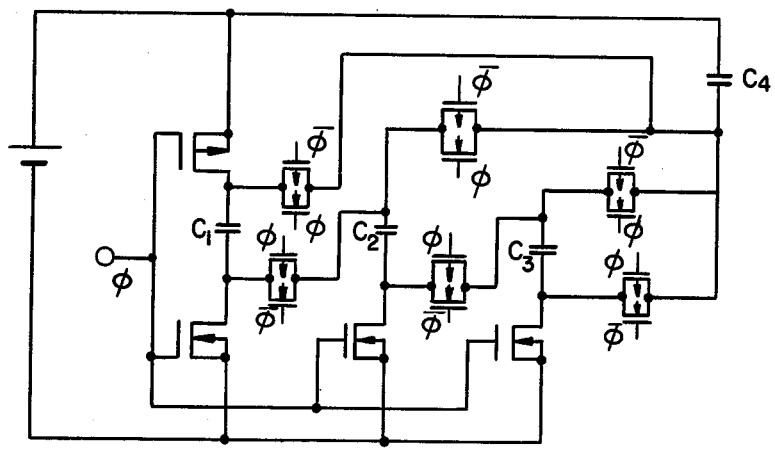
FIG. 7 illustrates a ¾ voltage dropping circuit according to the present invention.

FIG. 7 shows the embodiment of a ¾ voltage dropping circuit.

As described above, according to the present invention, it is possible to drop the voltage of the power source without any power loss. Furthermore, the circuit of the present invention is easily applicable to an integrated circuit. Therefore, the circuit according to the present invention is extremely suitable for the voltage dropping circuit of a electronic watch or the like. The circuit according to the present invention is very effective for use as a power source of a multiplex driver of a liquid crystal device, a power source of elements which operate with the voltage of less than 1.5 V, such as B-MOS, IIL or the like.

In the embodiment described above, the MOS-FETs and the transmission gates are used for the electronic switches. However, the switching devices are not limited to these devices.

Also, in the same way, it is possible to obtain a desired voltage dropping ratio in addition to the ratio of $(n-1)/n$ by adjusting the value of the capacitors.

Figure 8:
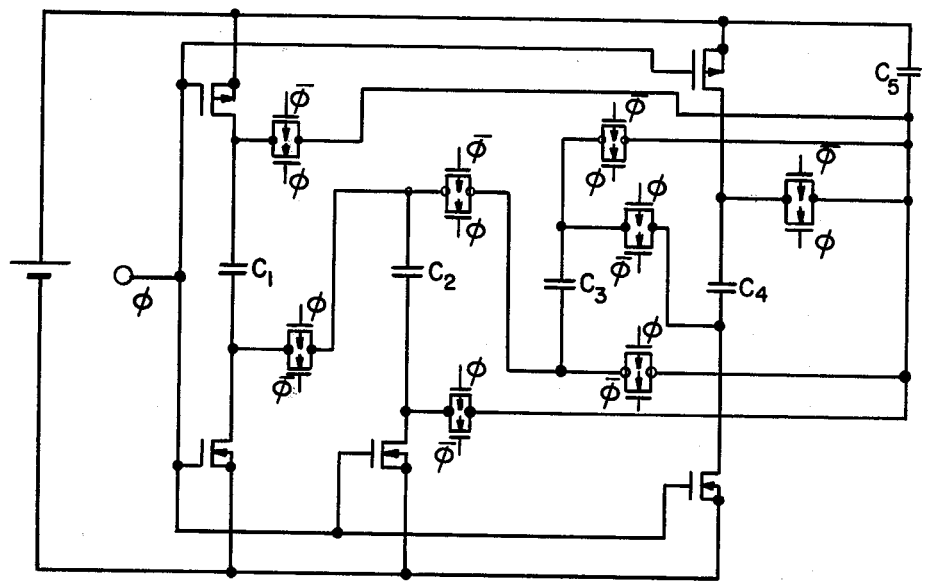
FIG. 8 illustrates a 3/5 voltage dropping circuit according to the present invention.

The embodiment of a 3/5 voltage dropping circuit is shown in FIG. 8.

I claim:

1. A voltage dropping circuit, comprising: a first MOS field effect transistor, a first capacitor and a second MOS field effect transistor connected in series in the named order; a first MOS field effect transmission gate responsive to control signals of opposite polarity and rendered conductive by a control signal of either polarity and a second capacitor connected in series with said first transmission gate, wherein the series combination of said first transmission gate and said second capacitor are connected in parallel with said first MOS field effect transistor with said first transmission gate connected to a junction of said first MOS field effect transistor and said first capacitor; a second MOS field effect transmission gate responsive to control signals of opposite polarity and rendered conductive by a control signal of either polarity and connected between a junction of said second capacitor and said first transmission gate and a junction of said first capacitor and said second MOS field effect transistor; means for applying a first control signal to respective gates of said first and second MOS field effect transistors and to said first and second transmission gates so as to render one transmission gate conductive and the other transmission gate non-conductive; and means for applying a second control signal to said first and second transmission gates so as to render one transmission gate conductive and the other transmission gate non-conductive.

2. A voltage dropping circuit according to claim 1; wherein said first and second MOS field effect transistors have opposite channel polarity.

3. A voltage dropping circuit according to claim 1, further comprising: a voltage source connected across the series combination of said first and second MOS field effect transistors and said first capacitor; and means defining an output terminal at said junction of said second capacitor and said first transmission gate; wherein the first control signal is effective for flowing a current from said voltage source to charge said first and second capacitors in series and develop an output voltage at said output terminal, and the second control signal is effective for electrically connecting said first and second capacitors in parallel and the parallel combination of said first and second capacitors in series with said voltage source and develop an output voltage at said output terminal.

* * * * *